(12) United States Patent
DeYoung et al.

(10) Patent No.: US 9,338,948 B2
(45) Date of Patent: May 17, 2016

(54) PLANT POT HOLDER TRAY

(71) Applicant: East Jordan Plastics, Inc., East Jordan, MI (US)

(72) Inventors: Shawn DeYoung, Saugatuck, MI (US); Mark Lercel, East Jordan, MI (US); Nathan Diller, East Jordan, MI (US)

(73) Assignee: East Jordan Plastics, Inc., East Jordan, MI (US)

( * ) Notice: Subject to any disclaimer, the term of this patent is extended or adjusted under 35 U.S.C. 154(b) by 55 days.

(21) Appl. No.: 14/109,421

(22) Filed: Dec. 17, 2013

(65) Prior Publication Data

US 2014/0165467 A1 Jun. 19, 2014

Related U.S. Application Data

(60) Provisional application No. 61/738,627, filed on Dec. 18, 2012.

(51) Int. Cl.
*A01G 9/02* (2006.01)
*A01G 9/04* (2006.01)

(52) U.S. Cl.
CPC ...................... *A01G 9/045* (2013.01)

(58) Field of Classification Search
CPC ....... A01G 9/10; A01G 9/104; A01G 9/1066; A01G 9/027; A01G 9/045
USPC ............ 47/66.5, 65.9, 73, 77; 220/23.2, 23.8, 220/23.83
See application file for complete search history.

(56) References Cited

U.S. PATENT DOCUMENTS

| | | | |
|---|---|---|---|
| D130,065 S | 10/1941 | Rico et al. | |
| 2,661,574 A | 12/1953 | Ritter | |
| 2,828,047 A | 3/1958 | Weiselberg | |
| 3,142,133 A | 7/1964 | Brooks | |
| 3,297,289 A | 1/1967 | Raus | |
| 3,825,126 A | 7/1974 | Pohl et al. | |
| 4,213,271 A | 7/1980 | Petruzzi et al. | |
| 4,218,008 A * | 8/1980 | Veilleux | 229/406 |
| D259,917 S | 7/1981 | Horsting | |
| 4,330,059 A | 5/1982 | Freeman | |

(Continued)

FOREIGN PATENT DOCUMENTS

| | | |
|---|---|---|
| DE | 4105973 A1 | 8/1992 |
| EP | 0829216 A2 | 3/1998 |

(Continued)

OTHER PUBLICATIONS

Images of a plant pot holder tray produced by Grand Haven Custom Molding of Grand Haven, Michigan prior to Dec. 18, 2012.

*Primary Examiner* — Monica Williams
(74) *Attorney, Agent, or Firm* — Gardner, Linn, Burkhart & Flory, LLP

(57) ABSTRACT

A plant pot tray having receptacles configured to receive pots of various sizes, with the receptacles including a side wall portion, a base wall portion, and one or more tabs with a longitudinal hinge portion connecting the tab to the side wall portion. The tabs each extend inwardly toward an interior of the receptacle with the tab configured to pivot along the longitudinal hinge portion whereby the tab is able to pivot upon insertion of a plant pot into a receptacle with the tab providing a biasing force against the plant pot to aid in retention of the plant pot in the tray and accommodate differently sized pots.

12 Claims, 7 Drawing Sheets

(56) References Cited

U.S. PATENT DOCUMENTS

| | | | |
|---|---|---|---|
| 4,684,013 A | 8/1987 | Jacobs | |
| 4,793,097 A | 12/1988 | Whitcomb | |
| 4,998,378 A * | 3/1991 | Spencer | 47/77 |
| 5,022,183 A | 6/1991 | Bohlmann | |
| 5,316,173 A * | 5/1994 | Emery | 220/556 |
| 5,320,216 A | 6/1994 | Pangborn | |
| 5,345,712 A | 9/1994 | Lambert | |
| 5,481,825 A | 1/1996 | Aoyama | |
| 5,803,264 A | 9/1998 | Gersten et al. | |
| 5,833,056 A | 11/1998 | Goldman | |
| 5,957,276 A | 9/1999 | Cutler et al. | |
| 6,102,204 A | 8/2000 | Castleberry | |
| 6,125,577 A | 10/2000 | Merzweiler et al. | |
| 6,202,836 B1 | 3/2001 | Picciolo | |
| 6,398,056 B1 * | 6/2002 | Letourneau et al. | 220/23.8 |
| 6,453,613 B1 | 9/2002 | Gratz | |
| D491,802 S | 6/2004 | Griffith et al. | |
| 6,745,514 B1 | 6/2004 | Myrland | |
| D502,669 S | 3/2005 | Smith et al. | |
| 7,020,997 B1 | 4/2006 | Thomas | |
| 7,225,927 B2 * | 6/2007 | Sweeney | 206/564 |
| D598,809 S | 8/2009 | Smith et al. | |
| D606,422 S | 12/2009 | Schmidt | |
| 7,673,416 B2 | 3/2010 | Smith et al. | |
| 7,762,396 B1 * | 7/2010 | Yang et al. | 206/427 |
| 7,828,196 B2 | 11/2010 | De Pagter et al. | |
| 7,845,114 B2 | 12/2010 | Kirtz et al. | |
| D664,044 S | 7/2012 | Robertson | |
| 2002/0005012 A1 * | 1/2002 | Cochran | 47/66.5 |
| 2004/0251703 A1 | 12/2004 | Griffith et al. | |
| 2005/0045629 A1 * | 3/2005 | Conarro et al. | 220/23.8 |
| 2008/0083636 A1 | 4/2008 | Devine | |
| 2008/0115413 A1 | 5/2008 | Blackmore | |
| 2008/0276530 A1 | 11/2008 | Trabka | |
| 2011/0272299 A1 | 11/2011 | Smith | |

FOREIGN PATENT DOCUMENTS

| | | |
|---|---|---|
| GB | 2258454 A | 2/1993 |
| GB | 2342028 A | 4/2000 |
| JP | 10084779 A | 4/1998 |
| JP | 2009011605 A | 1/2009 |
| WO | 90/05447 A1 | 5/1990 |
| WO | 2004/063020 A2 | 7/2004 |
| WO | 2011/147020 A1 | 12/2011 |

* cited by examiner

PLANT POT HOLDER TRAY

CROSS REFERENCE TO RELATED APPLICATION

The present application claims priority of U.S. provisional application Ser. No. 61/738,627, filed Dec. 18, 2012 for PLANT POT HOLDER TRAY, which is hereby incorporated herein by reference in its entirety.

BACKGROUND OF THE INVENTION

The present invention is directed to a plant pot holder tray, and in particular a tray having receptacles that includes flexible arms or tabs for assisting retention of variously sized pots placed therein.

Plant trays having multiple locations in which pots may be retained are used in the horticultural industry for simultaneously holding and transporting multiple plant pots, including pots for flowering and non-flowering plants. All manner of sizes of pots are employed by growers, wholesalers and/or retailers in the growing and distribution of such plants, including based on the type and/or size of plant contained therein. As such, in practice a multitude of different trays are utilized in order to accommodate the varying pots that are used in industry.

SUMMARY OF THE INVENTION

The present invention provides a plant pot holder tray for retaining multiple pots for plants therein, with the receptacles for receiving the pots including longitudinally oriented flexible tabs or arms that enable variously sized pots to be retained within the receptacles.

According to an aspect of the present invention, a plant pot tray includes multiple receptacles configured to receive a plant pot, with the receptacle including a side wall portion, a base wall portion, and one or more tabs with a longitudinal hinge portion connecting the tab to the side wall portion. The tab extends inward toward an interior of the receptacle with the tab configured to pivot along the longitudinal hinge portion whereby the tab is able to pivot upon insertion of a plant pot into the receptacle with the tab providing a biasing force against the plant pot to aid in retention of the plant pot in the tray.

In particular embodiments the tab extends longitudinally along the side wall portion for a majority of the height of the side wall portion, and may extend substantially the entire distance. Still further, a transverse hinge portion may be included that connects an upper portion of the tab to the side wall portion.

The tab or tabs may also be provided with multiple segments or panels that are non-planar with respect to one another. This includes a ramp segment extending inward into the interior of the receptacle from the side wall portion and downward relative to an upper edge of the receptacle, where the ramp segment operates as a cam by being contacted by a pot that is being inserted into the receptacle to thereby flex the tab to receive the pot. The tab may additionally include a retention segment that is disposed inward from the side wall portion and extends approximately parallel with the side wall portion, with the retention segment being configured to engage the side of a pot when located in the receptacle. The retention segment is adjacently located to the ramp segment. Still further, the tab may also include a hinge segment connected to the side wall portion by the longitudinal hinge segment. The hinge segment extends inward into the interior from the side wall portion, with the hinge segment being adjacently connected to the ramp segment and the retention segment.

The plant pot tray of the present invention enables variously sized plant pots to be securely retained within the receptacles via the biasing force placed on the pots by the flexible arms or tabs when inserted into the receptacle. The longitudinal arrangement of the tabs provides greater contact against the sides of the pots retained therein and, accordingly, greater stabilization to accommodate pots of varying sizes.

These and other objects, advantages, purposes and features of this invention will become apparent upon review of the following specification in conjunction with the drawings.

DESCRIPTION OF THE PREFERRED EMBODIMENTS

Figure 5:
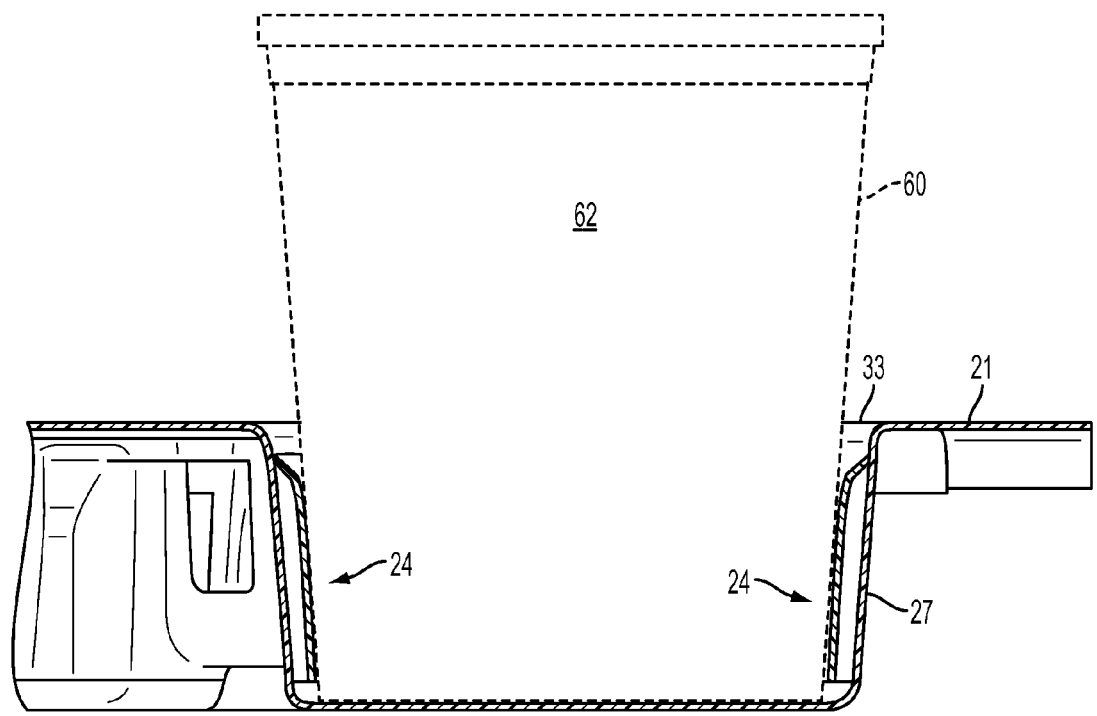
FIG. 5 is a cross-sectional view taken along the corresponding line of FIG. 2 illustrating a pot received within the receptacle.
Figure 6:
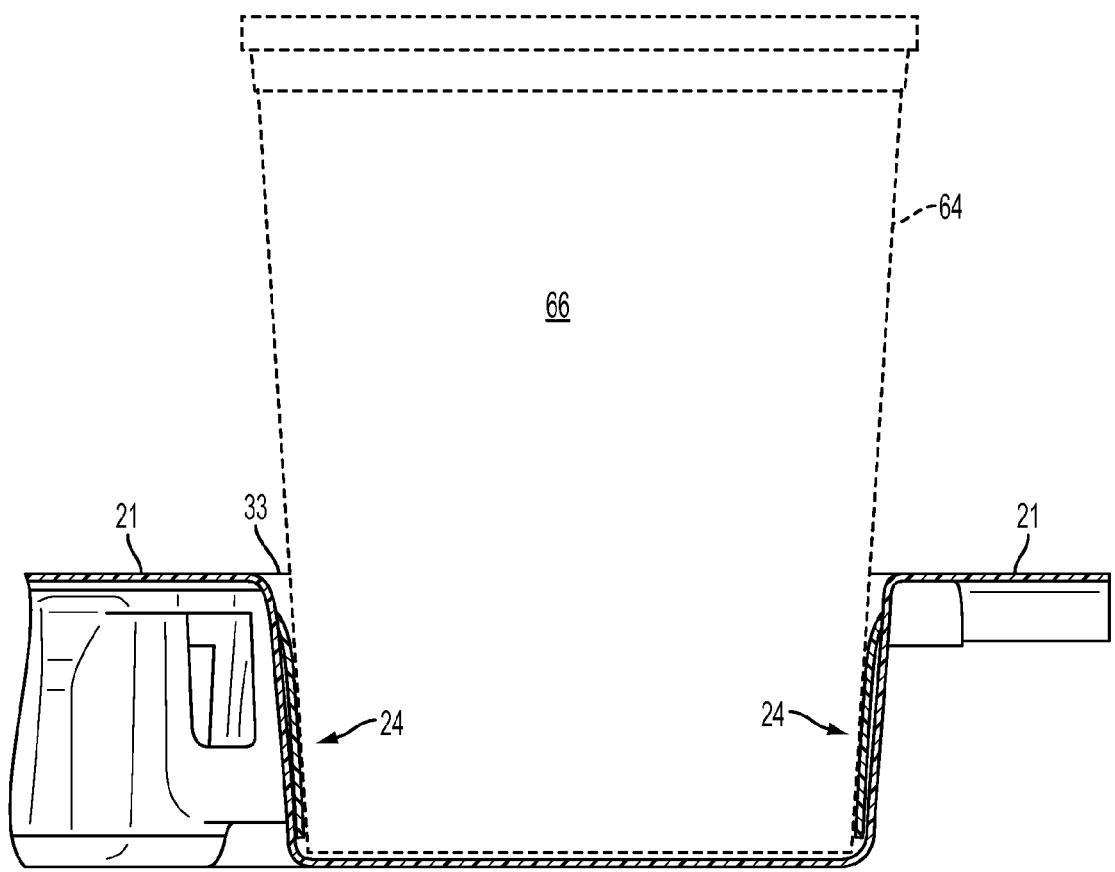
FIG. 6 is a cross-sectional view taken along the corresponding line of FIG. 2 illustrating a larger pot contained therein.

The present invention will now be described with reference to the accompanying figures, wherein the numbered elements in the following written description correspond to like-numbered elements in the figures. Tray 20 in the illustrated embodiment is constructed of a plastic material and includes multiple receptacles 22 having interiors 23 for receiving plant pots as shown in FIGS. 5 and 6. Each receptacle 22 includes one or more flexible arms or tabs 24, with the tabs 24 operating to place a biasing or retention force on pots contained within receptacle 22 (FIGS. 5 and 6) to thereby aid in securing the pot within the receptacle 22 and enabling tray 20 to accommodate pots of varying sizes.

As understood from FIGS. 1-4, the receptacles 22 of tray 20 include upright or side wall portions 27 disposed about tabs 24, where the wall portions 27 define a cylindrical perimeter of receptacle 22. Also included in each receptacle 22 is a bottom or base wall portion 32 that supports the bottom of a pot when placed into the receptacle 22, where the bottom wall portions 32 define a lower or bottom plane of tray 20. Tray 20 further includes a number of apertures in wall portions 32 and 27 that reduce the amount of material required for forming tray 20 and may accommodate drainage from pots, such as apertures 29 in side wall portions 27 and apertures 31 in base wall portions 32. It should be appreciated, however, that an alternative tray may be formed with an alternative arrangement of apertures, or even without apertures, and still operate as intended.

Each receptacle 22 in the illustrated tray 20 includes four tabs 24, with pairs of tabs 24 being disposed approximately 180 degrees opposed from one another about the circumference of the receptacle 22. The tabs 24 are constructed to normally project inwardly of the receptacles 22 relative to wall portions 27 prior to a pot being received therein. As discussed below, tabs 24 are forced to pivot or bend outwardly relative to the receptacle 22 upon a pot being inserted therein, with tabs 24 providing a biasing force against the exterior of the pot to aid retention of pots in receptacles 22 while enabling receptacles 22 to accommodate pots of varying diametrical sizes.

Details of tabs 24 will now be discussed with reference to FIGS. 3 and 4. Tab 24 is joined with wall portion 27 at a generally vertical connection that comprises a first or longitudinal hinge portion 26, as well as at a generally horizontal connection that comprises a second or transverse hinge portion 50, with tab 24 being operable to move or deflect along the connections defined by hinge portions 26 and 50. In the illustrated embodiment longitudinal hinge 26 is shown to extend vertically and transverse hinge 50 is shown to be disposed horizontally relative to the elongate axial orientation of receptacle 22 at an upper portion of the tab relative to opening 33 of receptacle 22, where the elongate axial orientation corresponds to the direction in which pots are aligned with the receptacle 22 when inserted into opening 33. It should be appreciated, however, that alternatively the hinges may still extend longitudinally and transversely without being exactly vertical or horizontal, respectively, relative to the elongate axis of receptacle 22.

Also in the illustrated embodiment, longitudinal hinge 26 is shown to extend substantially the entire length of tab 24, with transverse hinge 50 extending across a majority of the width of tab 24. Alternative lengths of connections, however, may be operatively employed. For example, as shown in FIG. 4A an alternative tab 124 is illustrated in which a longitudinal hinge portion 126 is provided that is slightly smaller than longitudinal hinge portion 26 shown in FIG. 4 because it does not extend to base wall portion 32. Tab 125 also includes a minimal or negligible transverse hinge portion 150. Accordingly, tab 24 provides a stiffer tab 24 with greater resistance to bending relative to tab 124 and, correspondingly, an increased bias retention force on pots placed within receptacles 22 utilizing tabs 24. Still further, tabs 24 are shown to have a length or height extending substantially the entire height of side wall portions 27 (see FIG. 4B) from base wall portions 32 to an upper edge or surface 21 of tray 20, where surface 21 defines an upper or top plane of tray 20. It should additionally be appreciated that tabs 24 of alternative lengths relative to side wall portions 27 may be employed within the scope of the present invention.

Figure 1:
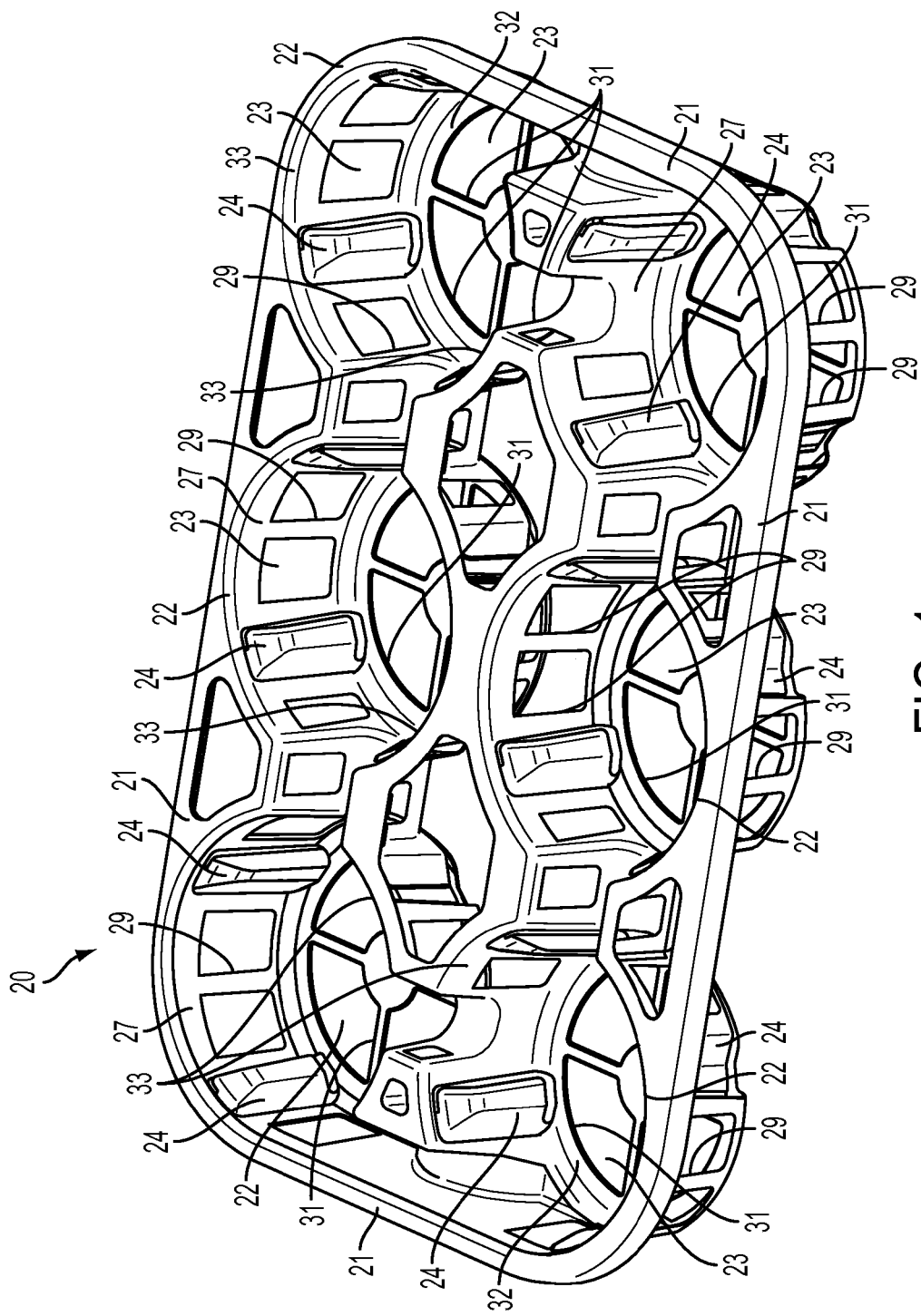
FIG. 1 is a perspective view of a tray in accordance with an aspect of the present invention.
Figure 2:
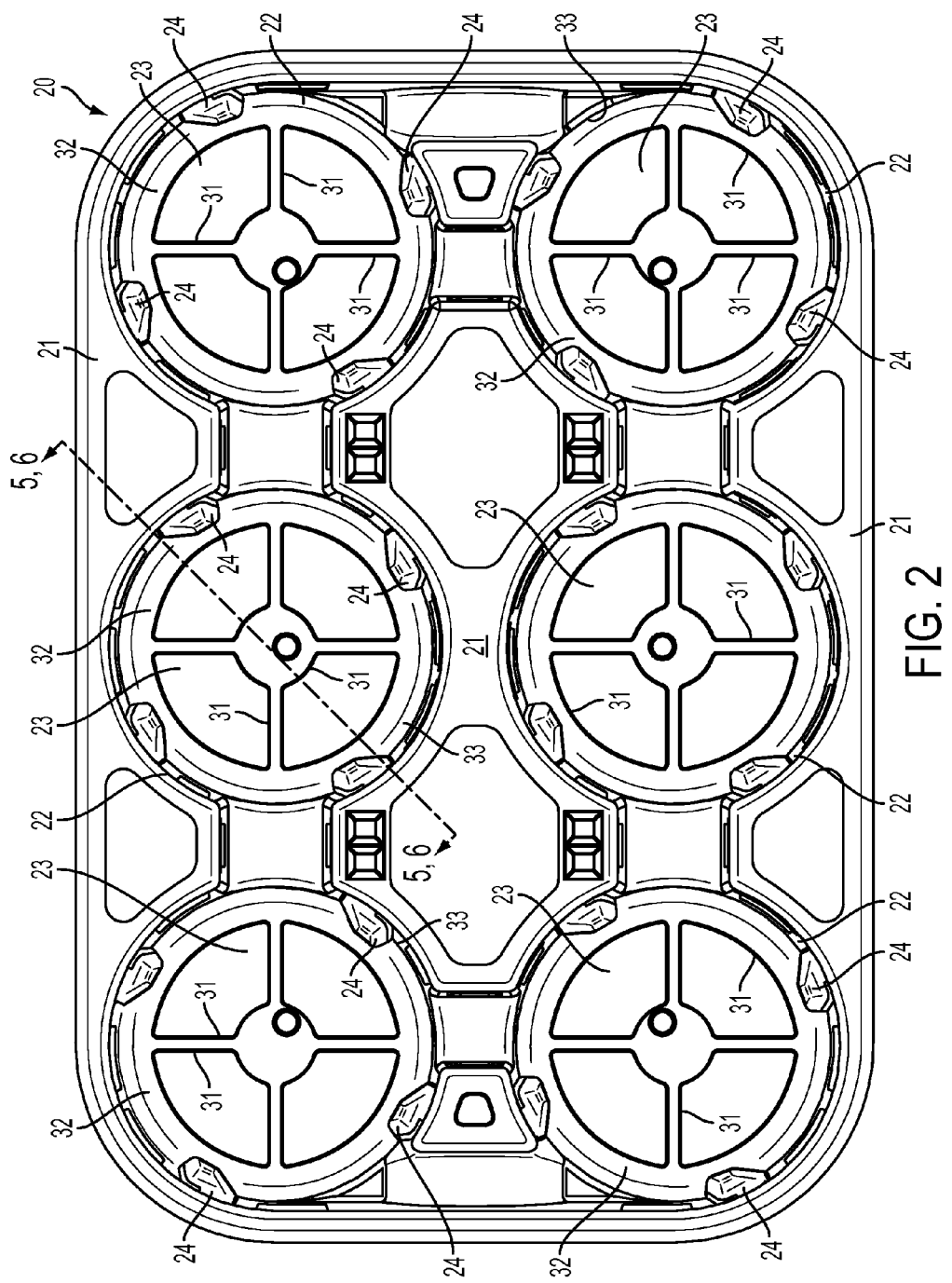
FIG. 2 is a top plan view of the tray of FIG. 1.
Figure 3:
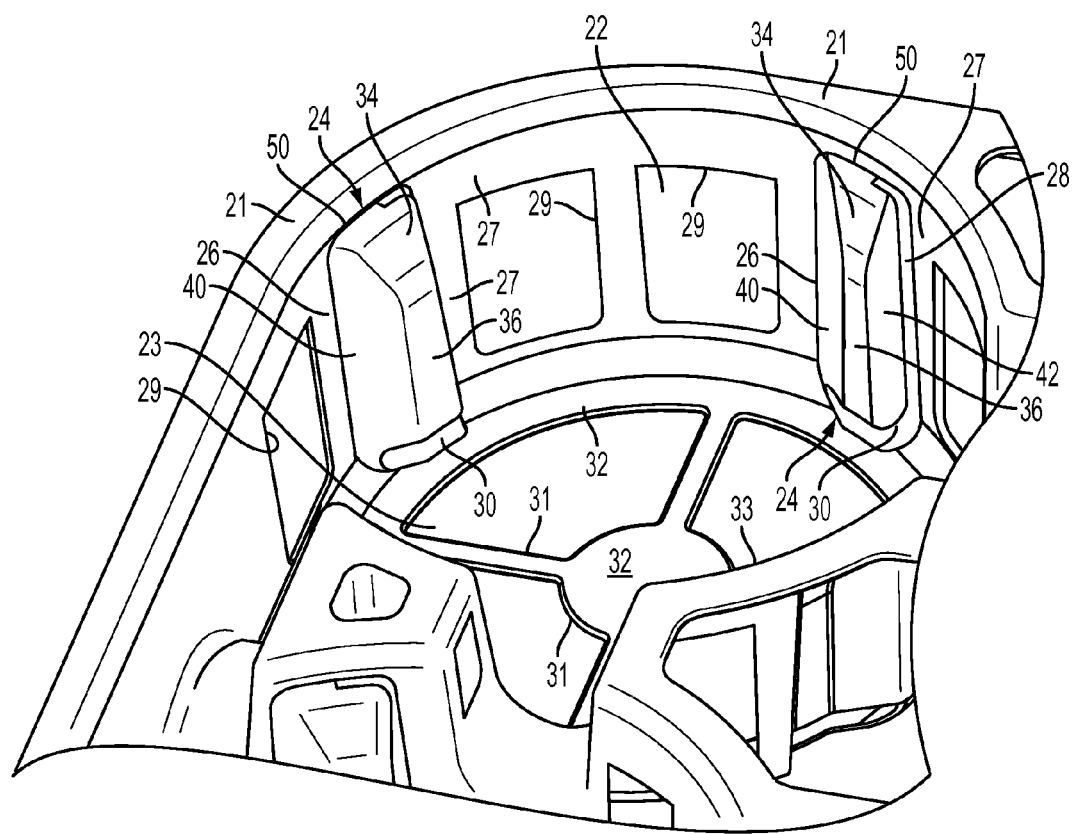
FIG. 3 is a close-up perspective view of a receptacle of the tray of FIG. 1.
Figure 4:
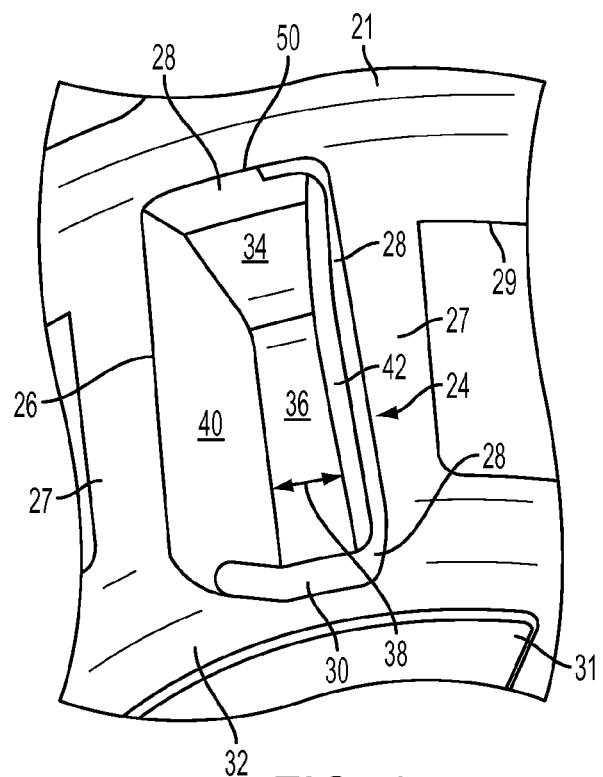
FIG. 4 is a close-up perspective view of a tab in accordance with an aspect of the present invention from the tray of FIG. 1.
Figure 4A:
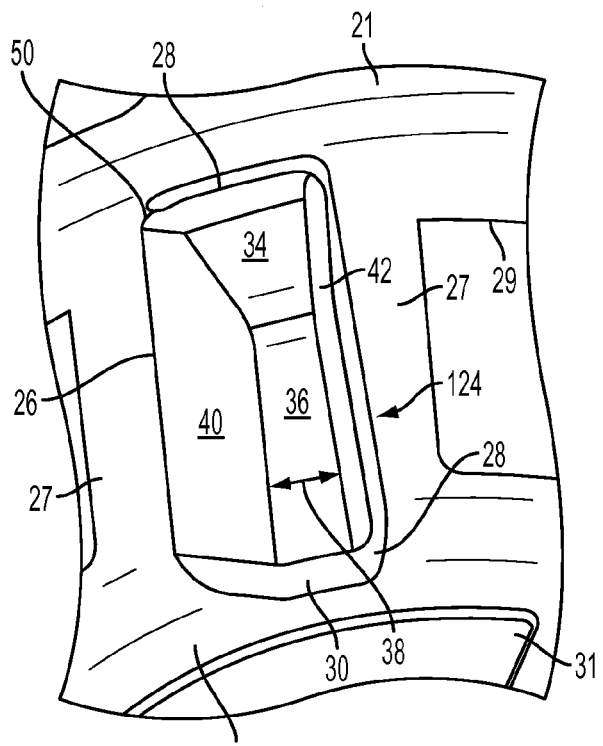
FIG. 4A is a close-up perspective view of an alternative tab in accordance with an aspect of the present invention.
Figure 4B:
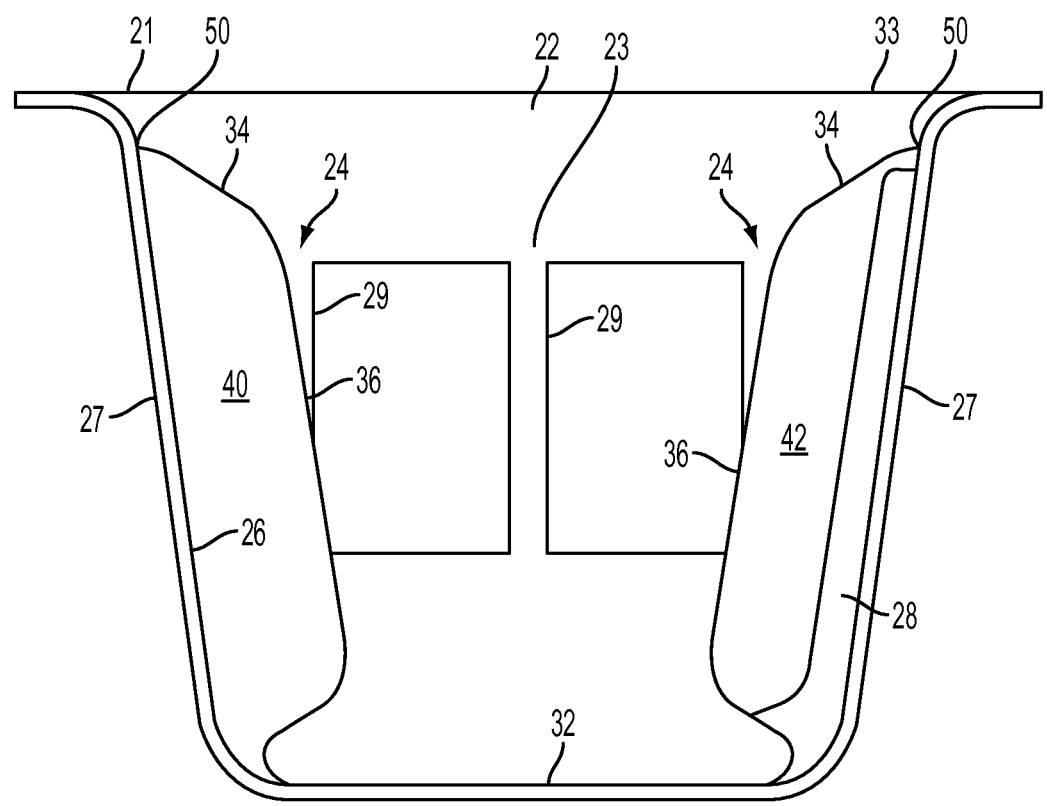
FIG. 4B is a partial side sectional view illustrating a pair of tabs of a receptacle from the tray of FIG. 1.

As understood from FIGS. 3 and 4, each tab 24 includes a plurality of surfaces or segments defining various planes or panels with an opening or gap 28 surrounding tab 24 apart from where tab 24 is joined to the inner cylindrical wall 27 at longitudinal hinge connection 26 and transverse hinge connection 50. Also included is a cutout 30 at the base wall portion 32 of receptacle, with cutout 30 allowing multiple trays 20 to be stacked together in a nested arrangement, with a tab 24 from a lower tray 20 being received behind a tab 24 of a tray 20 positioned immediately above. As thus understood, cutout 30 extends into base wall portion 32 a distance approximately equal to the distance which tab 24 extends from side wall portion 27 into interior 23.

Tab 24 includes a first surface or segment 34 that is downwardly angled relative to the adjacent side wall portion 27 and the longitudinal axis of the receptacle 22, with segment 34 defining a cam or ramp segment. The lower circular edge of a pot being placed within receptacle 22 will initially contact surface 34 to thereby deflect tab 24 as the pot is inserted into receptacle 22 and slid along surface 34 as the pot is lowered into receptacle 22. Segment 34 thereby aids in deflecting tab 24 to aid insertion of a pot into receptacle 22. As understood from FIGS. 4 and 4B, segment 34 extends from wall portion 27 and forms or defines a plane that extends inward from wall portion 27 toward the interior 23 of receptacle 22 and is angled downward from wall portion 27 toward the base wall portion 32.

Tab 24 further includes a second surface or segment 36 that is adjacent to and vertically below segment 34, with segment 36 being longitudinally oriented relative to the axis of the receptacle 22. Upon insertion of a pot into receptacle 22, the segments 36 of the various tabs 24 will be biased into contact or engagement with the exterior surface of the pot for retention of the pot within receptacle 22 (see FIGS. 5 and 6A), whereby segments 36 comprise retention segments. Segment 36 has a width 38, with segment 36 providing an increased contact area against the cylindrical exterior surface of the pot compared to a tab that contacts a pot with just an edge. As understood from FIGS. 4 and 4B, segment 36 defines a plane that is located inward of wall portions 27 and extends downward from segment 34 approximately parallel with side wall portions 27.

Tab 24 also includes a third surface or segment 40 that extends longitudinally from longitudinal hinge connection 26, with segment 40 extending partially radially inward of receptacle 22 from wall portion 27 to thereby place tab 24, and in particular segments 34 and 36, into position for contacting a plant pot. Segment 40 is adjacent first segment 34 and second segment 36 to define a hinge or side segment. Tab 24 further includes a fourth segment 42 opposite from third segment 40 about first segment 34 and second segment 36.

FIGS. 5 and 6 illustrate tray 20 accommodating pots of alternative sizes. In FIG. 5 a first pot 60 is contained within receptacle 22, with tabs 24 being partially deflected outward and retention segments 36 pressed up against the side wall 62 of pot 60. In FIG. 6 a second pot 64 is contained within receptacle 22, with pot 64 being diametrically larger than pot 60. Accordingly, pot 64 further deflects tabs 24 outward relative to receptacle 22, with retention segments 36 pressing against side wall 66 to aid in retention of pot 64 therein. As understood from FIGS. 4B, 5 and 6, side walls 27 define a generally frustoconical or diametrically tapered shaped receptacle 22 having a larger diameter adjacent the top or upper edge 21 and decreasing toward bottom wall portion 32 corresponding to the tapered diametrical shape of pots, such as pots 60 or 64.

Tray 20 is constructed by molding and includes at least one continuous lower edge or brace extending lengthwise on a bottom side of tray 20 for aiding in movement of tray 20 on a rack system. Although tray 20 is shown to include six receptacles 22 in the illustrated embodiment, an alternative tray may include more or less than six receptacles. In addition, although shown with wall portions 27 being rounded or curved to define tapered cylindrical walls, alternative wall shapes and configurations may be employed. Still further, as best understood with reference to FIGS. 3-4B, the various surfaces or segments or tab 24 are shown to have sharp edges there between for illustrative purposes, such as between segments 34, 36, 40 and 42, wherein when being molded tray 20 will have more rounded interconnections between the various segments.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A plant pot tray, said tray comprising:
   a receptacle configured to receive a plant pot, with said receptacle including a side wall portion, a base wall portion, and a tab with a longitudinal hinge portion connecting said tab to said side wall portion;
   said tab being separated from said sidewall opposite said longitudinal hinge portion along the elongate longitudinal length of said tab to define a longitudinal opening opposite said longitudinal hinge portion with said longitudinal hinge portion and said longitudinal opening extending generally with the longitudinal axis of said receptacle, and said tab extending inward toward an interior of said receptacle with said tab configured to pivot along said longitudinal hinge portion whereby said tab is able to pivot upon insertion of a plant pot into said receptacle with said tab providing a biasing force against the plant pot to aid in retention of the plant pot in said tray, and wherein said tab includes a ramp segment with said ramp segment extending inward into said interior relative to said side wall portion and downward relative to an upper edge of said receptacle,
   wherein said tab includes a retention segment with said retention segment being disposed inward from said side wall portion and extending approximately parallel with said side wall portion, and wherein said retention segment is configured to engage the side of a pot when located in said receptacle,
   wherein said retention segment is adjacently located to said ramp segment with said ramp segment and said retention segment being non-planar relative to each other, and
   wherein said tab includes a hinge segment with said hinge segment being connected to said side wall portion by said longitudinal hinge portion and with said hinge segment extending inward into said interior from said side wall portion, with said hinge segment being adjacently connected to said retention segment and with said hinge segment and said retention segment being non-planar relative to each other.

2. The tray of claim 1, wherein said tab extends longitudinally along said side wall portion for a majority of the height of said side wall portion.

3. The tray of claim 2, wherein said tab extends longitudinally along substantially the entire distance between said base wall portion and said upper edge of said receptacle.

4. The tray of claim 1, further including a transverse hinge portion connecting an upper portion of said tab to said side wall portion.

5. The tray of claim 1, wherein said base wall portion includes a cutout positioned vertically below said tab, said cutout enabling said tray to be stacked on top of a correspondingly configured tray with the tab of the correspondingly configured tray being received behind said tab of said tray.

6. The tray of claim 1, further including a plurality of receptacles, and wherein each said receptacle includes a plurality of tabs.

7. A plant pot tray, said tray comprising:
   a plurality of receptacles each configured to receive a plant pot, with each said receptacle including a side wall portion, a base wall portion, and a tab with a longitudinal hinge portion connecting said tab to said side wall portion;
   said tab being separated from said sidewall opposite said longitudinal hinge portion along the elongate longitudinal length of said tab to define a longitudinal opening opposite said longitudinal hinge portion with said longitudinal hinge portion and said longitudinal opening extending generally with the longitudinal axis of said receptacle, and said tab extending longitudinally along said side wall portion for a majority of the height of said side wall portion with said tab extending inward toward an interior of said receptacle with said tab configured to pivot along said longitudinal hinge portion whereby said tab is able to pivot upon insertion of a plant pot into said receptacle with said tab providing a biasing force against the plant pot to aid in retention of the plant pot in said tray, and wherein said tab includes a ramp segment with said ramp segment extending inward into said interior relative to said side wall portion and downward relative to an upper edge of said receptacle,
   wherein each said tab further includes a transverse hinge portion connecting an upper portion of said tab to said side wall portion,
   wherein each said tab includes a retention segment with said retention segment being disposed inward from said side wall portion and extending approximately parallel with said side wall portion, and wherein said retention segment is configured to engage the side of a pot when located in said receptacle, and
   wherein each said tab includes a hinge segment with said hinge segment being connected to said side wall portion by said longitudinal hinge portion and with said hinge segment extending inward into said interior from said side wall portion, with said hinge segment being adjacently connected to said ramp segment and said retention segment and with said hinge segment, said ramp segment and said retention segment being non-planar relative to each other.

8. The tray of claim 7, wherein each said base wall portion includes a cutout positioned vertically below each said tab.

9. The tray of claim 7, wherein said receptacle includes a plurality of tabs.

10. A plant pot tray, said tray comprising:
    a plurality of receptacles each configured to receive a plant pot, with each said receptacle including a side wall portion, a base wall portion, and a plurality of tabs and a plurality of longitudinal hinge portions, with each said tab being connected to said side wall portion by one of said longitudinal hinge portions;
    each said tab being separated from said respective sidewall opposite said longitudinal hinge portion along the longitudinal length of said tab to define a longitudinal opening opposite said longitudinal hinge portion with said longitudinal hinge and said longitudinal opening extending generally with the longitudinal axis of said receptacle, and each said tab extending inward toward an interior of said receptacle, said tabs being configured to pivot along said longitudinal hinge portions upon insertion of a plant pot into said receptacle with said tabs providing a biasing force against the plant pot to aid in retention of the plant pot in said tray, and wherein each said tab includes a ramp segment with said ramp segment extending inward into said interior relative to said side wall portion and downward relative to an upper edge of said receptacle,
    wherein each said tab includes a retention segment with said retention segment being disposed inward from said side wall portion and extending approximately parallel with said side wall portion, and wherein said retention segment is configured to engage the side of a pot when located in said receptacle, wherein said retention segment is adjacently located to said ramp segment with said ramp segment and said retention segment being non-planar relative to each other, and wherein each said tab includes a hinge segment with said hinge segment being connected to said side wall portion by said longitudinal hinge portion and with said hinge segment extending inward into said interior from said side wall portion, with said hinge segment being adjacently connected to said retention segment and with said hinge segment and said retention segment being non-planar relative to each other.

11. The tray of claim 10, wherein said tabs extend longitudinally along respective said side wall portions for a majority of the height of said side wall portions.

12. The tray of claim 11, wherein each said base wall portion includes a cutout positioned vertically below each said tab.

* * * * *